United States Patent
Polivka et al.

[11] Patent Number: 5,828,979
[45] Date of Patent: Oct. 27, 1998

[54] AUTOMATIC TRAIN CONTROL SYSTEM AND METHOD

[75] Inventors: Alan L. Polivka; William L. Matheson, both of Palm Bay, Fla.

[73] Assignee: Harris Corporation, Melbourne, Fla.

[21] Appl. No.: 856,754

[22] Filed: May 15, 1997

Related U.S. Application Data

[63] Continuation-in-part of Ser. No. 299,271, Sep. 1, 1994, Pat. No. 5,623,413.

[51] Int. Cl.$^6$ ........................................... B61L 3/00
[52] U.S. Cl. .................. 701/117; 701/50; 246/5; 246/167 R
[58] Field of Search ................. 701/117, 50; 246/5, 246/167 R

[56] References Cited

U.S. PATENT DOCUMENTS

| | | | |
|---|---|---|---|
| 4,093,161 | 6/1978 | Auer | 701/117 |
| 4,122,523 | 10/1978 | Morse et al. | 701/117 |
| 4,179,739 | 12/1979 | Virnot | 701/117 |
| 4,361,301 | 11/1982 | Rush | 701/117 |
| 4,561,057 | 12/1985 | Haley et al. | 701/117 |
| 4,774,669 | 9/1988 | Schmitz et al. | 701/117 |
| 5,390,880 | 2/1995 | Fukawa et al. | 246/167 R |
| 5,650,930 | 7/1997 | Hagenbuch | 701/50 |

Primary Examiner—Kevin J. Teska
Assistant Examiner—Tyrone V. Walker
Attorney, Agent, or Firm—Rogers & Killeen

[57] ABSTRACT

A system and method for controlling the movement of plural freight trains through a multiple route railway system with improved efficiency and safety. Freight train movements are precisely monitored and orchestrated in accordance with a dynamic schedule that is determined through an evaluation of delivery requirements, coordination among all trains, speed restrictions and the effects of the track topography and train consist on train response to brake and power application.

35 Claims, 14 Drawing Sheets

AUTOMATIC TRAIN CONTROL SYSTEM AND METHOD

This is a continuation-in-part of application Ser. No. 299,271 filed Sep. 1, 1994 entitled SCHEDULING SYSTEM AND METHOD, now U.S. Pat. No. 5,623,413.

BACKGROUND OF THE INVENTION

The present invention relates to the control of the movement of plural trains through a network of track in a multiple route railway system, and more particularly to a method and system of controlling the movement of a lengthy freight train in which the train movements are precisely monitored and orchestrated in accordance with a dynamic schedule that is determined through an evaluation of, inter alia, delivery schedule requirements, coordination among all trains, applicable speed restrictions and the effects of the track topography and train consist on train response to brake and power applications.

Today's freight railroads consist of a rail infrastructure, including track, switches, a communication system and a control system, and rolling stock, including locomotives and cars. Generally, each of these components is employed by the use of a high level schedule which assigns locomotives and cars to the various sections of track and allows them to move over that track in a manner that avoids collisions and permits the railway system to deliver goods to various destinations. Two basic limitations of the present system are the inability to exert precise, closed loop control over the movement of the trains, and the inability to quickly respond to unplanned disruptions in service in the most cost-efficient manner. It would be highly desirable to have the ability to better hold trains to their schedule and respond to disruptions in service automatically by exerting precise, closed loop control over the movement of trains. In addition, it would be highly desirable to improve the degree of safety with which train movements are directed and controlled.

Generally, the trains in presently operating railway systems are indirectly controlled using the services of a dispatcher who sets signals at periodic intervals on the track (or employs other methods, such as issuing a verbal or written authority for train movement over a lengthy section of track), but the actual control of the train is left to the engineer operating the train. Using this present method, there is a very high degree of unpredictability about when a train will reach various points of significance along its route and when it will reach its destination.

As explained in the above-referenced related application Ser. No. 08/299,271, the disclosure of which is incorporated by reference, the train schedules have not heretofore been very precise because it has been difficult to account for all the factors that affect the movement of the train when attempting to set up a schedule. These difficulties include the complexities of including in the schedule the determination of the effects of physical limits of power and mass, the speed limits, the limits due to the signaling system, and the limits due to safe train handling practices (which include those practices associated with applying power and braking in such a manner as to avoid instability of the train which may cause derailment). The makeup of freight trains varies widely from one trip to another. Further, the length, mass, and operating characteristics of the freight trains will vary substantially as customers' requirements for carriage among the various terminals and the equipment utilized often vary substantially. Consideration of each of these factors is necessary in order to provide a freight train schedule which can be implemented by an achievable movement plan.

Even when an achievable movement plan is provided for scheduled trains, prior art systems and methods lack the flexibility to respond quickly and cost effectively to the inclusion of unplanned trains to a network of track. As will be appreciated, an entire movement plan may be disrupted by entry of a previously unplanned train into the network. The same may be said of anomalies, such as track outages, temporary speed restrictions, the presence on the track of track forces (repair/maintenance crews), occurrence of hot wheel bearings, and the like. It is desirable to provide a method and system which responds dynamically to such unplanned events in a manner that is assured to be very cost efficient. In order to do so requires that each train's position (also preferably velocity and acceleration) always be known with significantly greater precision than what is available at dispatch centers today.

FIG. 1 illustrates the control of trains in a typical system which may include a main track 10, a side track 20 which is selectively utilized through switches 22. Switches 22 may be manually operated or may be remotely operated in conjunction with signals 28 as a "control point", e.g. from the dispatch center. The bungalow 24 may receive voltages (or lack thereof) from track circuits 26 which indicate the absence (or presence) of a train on a section (or block) of track. The train system may also include signal aspects 28 indicating to the engineer whether segments of rail in front of the train are clear of traffic. Typically, in present railway systems, the operation of aspects 28 is controlled primarily by track circuits 26 and suitable electronic or relay-based control logic in the bungalow 24. The bungalow 24 may send information regarding various of the conditions supplied to it from the various sensors to a central dispatch 30 by the way of a codeline 32 or a codeline replacement system. Present systems provide positive separation between trains so long as the engineer obeys the signal aspects 28.

One difficultly in railway systems such as that shown in FIG. 1 is the lack of precise information as to the location of trains along the track. In a meet or pass situation, the switching onto the side track 20 must be accomplished well enough in advance to provide a planning margin before arrival of the other train. The planning margin is necessarily related to the precision with which the train locations are known.

Train location determination has been improved by prior art systems that estimate position continuously, or nearly so, may use microwave radar, satellite positioning systems (e.g., GPS), axial rotation and inductive coil loops. Intermittent position determinations may be provided by using transponders or interrogators and inductive spot coils or passive electronic "tags". However, such systems are typically designed for passenger trains that are relatively short and have a predictable load, making location determination a relatively simple matter of determining the location of the locomotive at the beginning of the train. In contrast, freight trains have varying numbers of cars (up to hundreds of cars) which create problems not pertinent to a passenger train control system where the trains generally have the same length and run on the same schedule every day. Furthermore, freight railroads can consist of several thousand miles of track, making installation and maintenance of track-based coils or tags undesirable. In any event, prior art systems used in freight railroads do not "close the loop" by integrating precision train location monitoring with scheduling and train control.

Freight trains have an end of train (EOT) that is substantially displaced from the beginning of the train, and the dynamics of freight train movement cause the train to compress or stretch as the couplings between cars adjust to speed changes or to changes in track topography (e.g., stretching up-hill). The determination of the location of the EOT is complicated and difficult to predict. Even greater uncertainty in EOT location can be attributed to inaccurate information regarding the train consist (quantity and type of cars making up the train). Nevertheless, EOT location is an important aspect of train control. The dynamics of freight train movement are also a factor in determining when and how to provide a speed adjustment. For example, the determination of a brake or power application point for a freight train will be affected by the number of cars, the distribution of the load, and track topography (i.e., whether the train is going up or down hill, or has one portion going up and another portion going down). A train control system, especially one for controlling lengthy freight trains, desirably is flexible enough to determine a suitable speed adjustment point for applying brakes or adjusting power anywhere in the network and with any train composition. The need for such flexibility is further illustrated by the fact that freight trains are forced into sidings far more frequently than passenger trains thus forcing more frequent determinations of speed adjustment points.

Accordingly, it is an object of the present invention to obviate the deficiencies of known systems and to provide a novel system and method for controlling the movement of a number of trains through a multiple route railway system.

It is an object of the present invention to provide a novel system and method in which a detailed and cost-effective movement plan is provided quickly and automatically to a plurality of freight trains in a track network for immediate implementation.

It is another object of the present invention to provide a novel train control system and method for freight trains which takes into account the effect of topography on the complex dynamics of freight train speed adjustment.

It is yet another object of the present invention to provide a novel system and method for controlling movement of freight trains in a network of track in which a trip plan (the relevant portion of the movement plan) is provided to each train via a datalink. A computer on board the locomotive may automatically implement the plan upon receiving it.

It is a further object of the present invention to provide a novel train control system and method for freight trains which takes into account the effect of topography on the determination of a brake or power application point.

It is yet a further object of the present invention to provide a novel train control system and method for freight trains in which the effect of topography on each car in the train is considered when determining a speed adjustment point.

It is still a further object of the present invention to provide a novel train control system and method for freight trains in which the effect of topography on each car in the train is considered by evaluating the change in potential energy for each car between points where speed adjustments begin and end.

It is yet another object of the present invention to provide a novel train control system and method for freight trains in which an automatic control system includes sufficient vitality so that the train can be operated primarily by such a control system.

These and many other objects and advantages of the present invention will be readily apparent to one skilled in the art to which the invention pertains from a perusal of the claims, the appended drawings, and the following detailed description of the preferred embodiments.

DETAILED DESCRIPTION OF PREFERRED EMBODIMENTS

Figure 1:
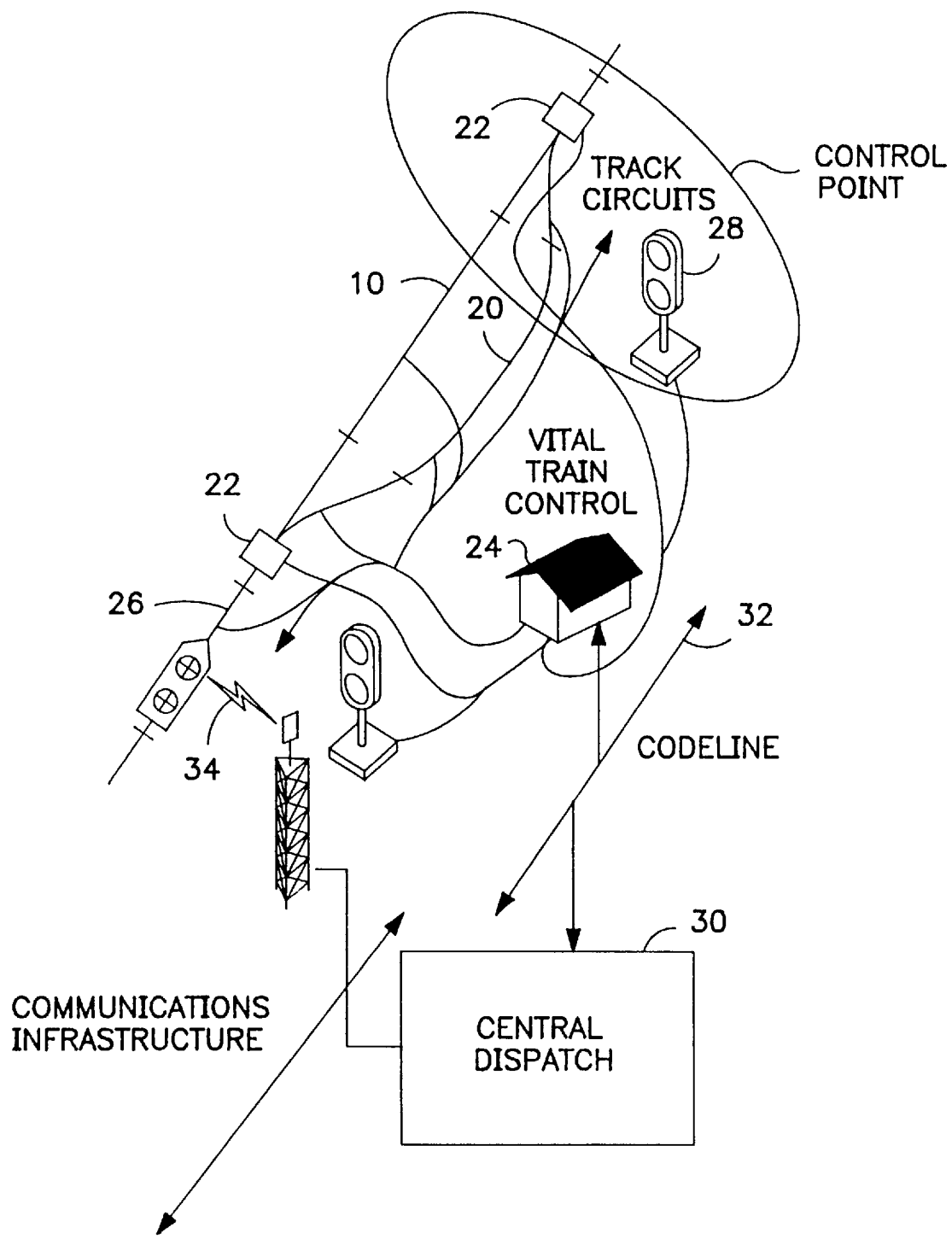
FIG. 1 is a schematic block diagram of a prior art system.
Figure 2:
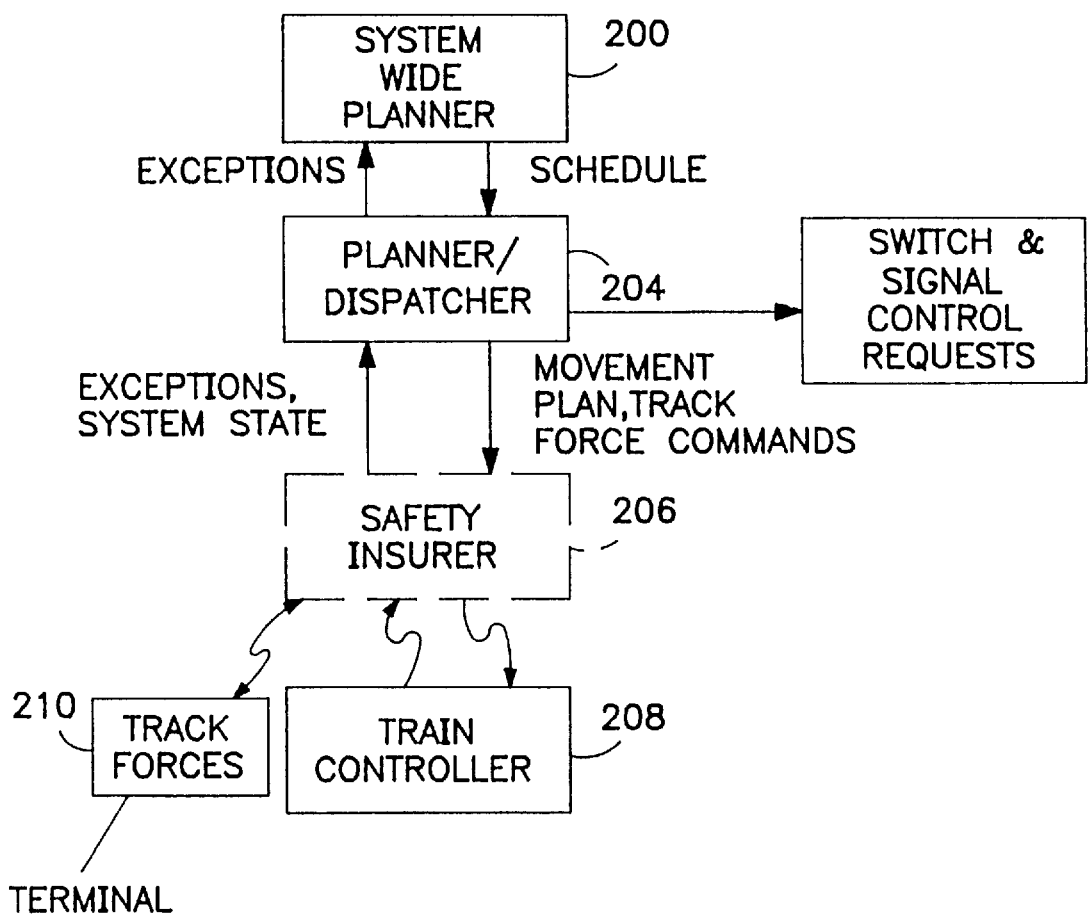
FIG. 2 is a functional block diagram of a system in which the present invention may operate.

With now reference to FIG. 2, a train control system in which the present invention may operate includes a system-wide planner or order scheduler 200, a planner/dispatcher 204, a safety insurer 206 and a train controller 208. System-wide planner 200 is responsible for overall system planning in allocating the various resources of the system to meet the orders or demands on the system in an optimal manner. System-wide planner 200 develops a coarse schedule for the use of the various resources and passes this schedule to the planner/dispatcher 204. Planner/dispatcher 204 receives the coarse schedule from system-wide planner 200 and determines a detailed schedule of the resources denoted herein as a movement plan. The relevant portion of the movement plan (referred to as a "trip plan") may then be dispatched to train controller 208 on board the locomotive in the trains being controlled. A trip plan may pertain to the entire trip for a train or crew, or may pertain to only a portion of the trip. Movement authorities associated with the movement plan developed by planner/dispatcher 204 may be checked by a safety insurer 206 to ensure that the movements being commanded by the planner/dispatcher will not result in any of the trains of the system being placed into an unsafe situation. Movement plans may also direct the movements of track force vehicles (vehicles used by maintenance of way personnel) and may respond to inputs generated by personnel using a track forces terminal. Planner/dispatcher 204 may also generate appropriate command requests to configure the railway system (e.g., track switches and signals) as needed to carry out the movement plan in an automated embodiment in a system of the present invention. Information regarding the position of the train, the settings of switches and the aspects of signals may be sent back to planner/dispatcher 204.

In the event that the train is unable to meet its movement plan, exceptions are passed back up the communication chain for handling by the next higher level as needed.

The movement plan is a timeline projection of the position of the trains throughout the plan and takes into account the physical forces which are expected to occur during the actual carrying out of the plan. For example, the movement planner takes into account the inertia of the train and the track parameters to provide a movement plan in which the fact that the train does not instantly reach its desired speed is accommodated.

Thus, the movement planner takes into account the speed changes and/or time effects of the various constraints over the specific track upon which the trains are being planned. For example, if the movement planner determines that a particular train will be placed on a siding, the movement planner accounts for the fact that the train may have to slow for switching and, particularly if the train is stopped on the siding, that the subsequent acceleration will not be instantaneous but will be an increase in velocity over a finite period of time in accordance with train mass, power available, traction, grade and curvature. In this way, the movement planner can generate the exact movement timeline profile which the train is expected to follow.

In the system and method herein, either fixed or moving block rules may be used. Fixed block rules reflect the segmentation of tracks into fixed blocks or segments having signals associated with block boundaries. Generally, in the prior art, the block size was set based upon the distance that the fastest, heaviest stopping train would take to stop. In train following situations, a following train would typically be kept behind the leading train by at least a multiple of the length of the fixed block.

Because the system of the present invention uses a very precise control geared specifically to the capabilities and dynamics of the specific trains being handled, the separation between trains can be made smaller than in the fixed block systems and can be made to reflect the actual braking distance of the specific trains, avoiding a "worst case" braking plan.

With continued reference to FIG. 2, a movement plan generated by a movement planner such as described in the above-referenced related application Ser. No. 08/299,271 may be used by planner/dispatcher 204 to control the operation of the trains. The movement plan may be automatically dispatched by planner/dispatcher 204 via a communication infrastructure to send the appropriate portions of the movement plan to train controllers 208 aboard the locomotives, to track forces terminals, and to remotely control the various track elements.

It is important to note the close tie between the movement plan as determined by planner/dispatcher 204 and the train movement which is implemented by train controller 208. If the movement timeline profile planned by planner/dispatcher 204 was not sufficiently detailed, including factors such as inertia, track parameters and train handling, train controller 208 would not be able to implement the plan and could be expected to inundate the planner/dispatcher with exception notices.

Figure 3:
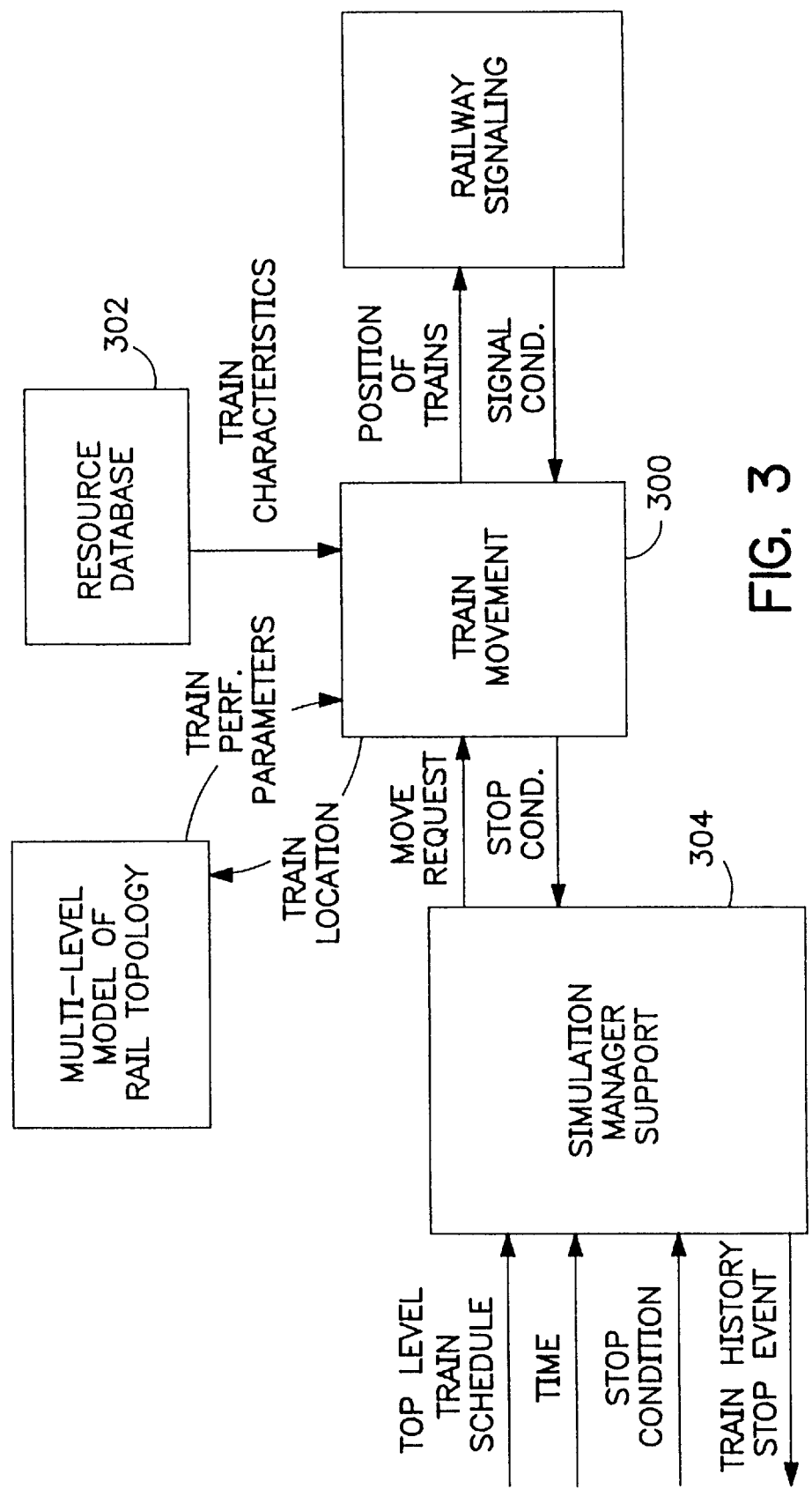
FIG. 3 is a functional block diagram of the physical model of the movement planner portion of the planner/dispatcher of FIG. 2.

With reference now to FIG. 3, a model 300 may be used in generating the movement plan. Data as to the position, direction, weight, aerodynamics and length of a train may be used to calculate the resistance of the train, by taking into account the grade and curvature of the track segments upon which the train is located, the train velocity and other train parameters.

Routing through the network of track may be computed by using any network routing algorithm. The well-known Shortest Path First (SPF) algorithm may be used. However, the algorithm need not use distance as the performance measure in computing path length, and more complex performance measures involving grades, fuel usage, combined costs, and/or profit for example, are often useful.

The characteristics of the railroad rolling stock may be stored on a conventional resource database 302. This includes the physical and performance data on each locomotive, its type, weight, length, cross sectional area, horsepower, number of axles, and streamline coefficients (both as lead and as following locomotive). For each car, the type, tare weight, length, cross sectional area, loaded weight, number of axles, and streamline coefficient may be provided. Unit trains are also defined in the database with an identifier, train speed limit, list of locomotive types and list of car types. This resource database may be implemented using any commercially available database.

The defined train objects may be propagated through the system in accordance with requests for train movement provided by simulation manager support 304. All train movement is in accordance with the equations of physics, basic train handling principles, and well-known train control rules. The route of each train, provided by simulation manager support 304 with possible inputs from external sources within the railroad as well, may consist of an ordered list of track segments from the source to the destination of each train trip with train direction on each segment also indicated.

Figure 4:
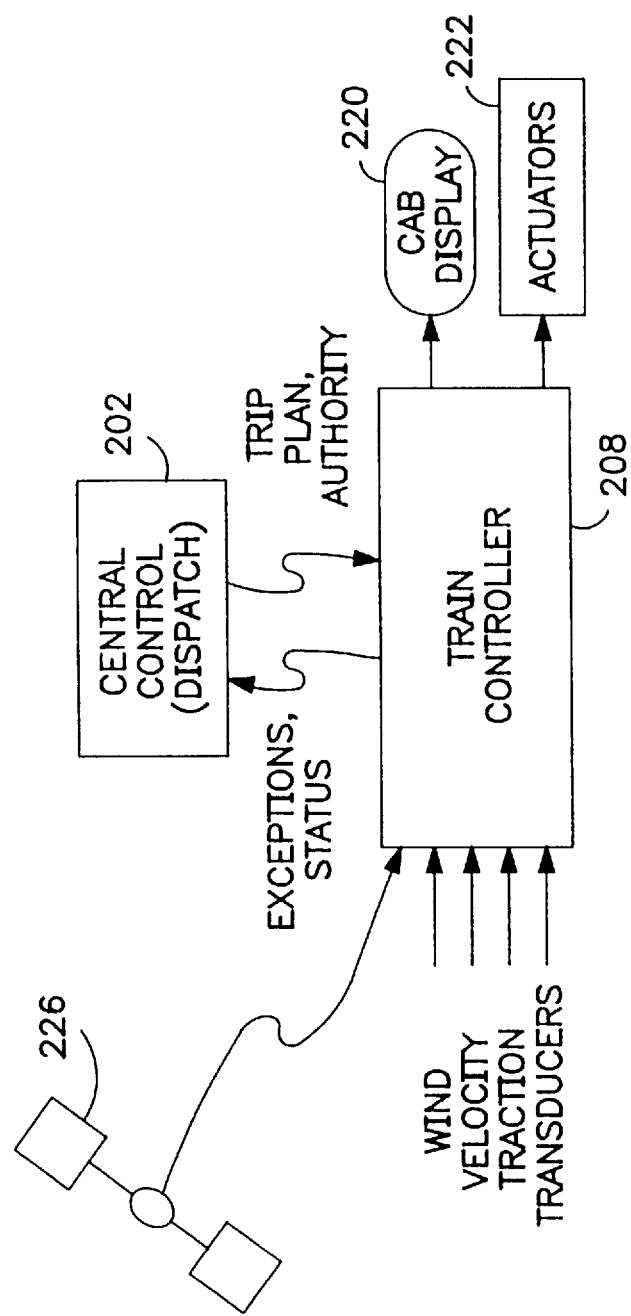
FIG. 4 is a functional block diagram of an embodiment of the train controller of the present invention.

With reference now to FIG. 4, at least one of the locomotives in each of the trains in the system has train controller 208. Train controller 208 receives a trip plan, which consists of as much of the movement plan as is applicable to it. Train controller 208 desirably contains a train pacing system which utilizes the track data model, the train handling constraints and actual train position and velocity data, optional wind data and optional track condition data to compute a set of train commands which, if implemented, will cause the train to operate on the movement timeline profile derived from the movement plan. The commands may be displayed on a display 220 in the cab of the locomotive for manual execution by the engineer or may be implemented automatically through conventional activations 222 with a driver override, if desired.

To evaluate its progress against the movement timeline profile of the movement plan, train controller 208 may be equipped with a suitable position determiner, which may receive signals from the Global Positioning System ("GPS") 226 and/or may receive signals from a track transducer or tag system. Any other suitable position determining system may be used in the present invention, but the GPS or transducer/tag system is particularly suitable because of the low cost to install and maintain while providing sufficiently accurate position information. The train controller may include an accelerometer and/or a gyro which can be used along with the track database in the train controller to determine which of two or more parallel tracks have been taken by the train. The distance between parallel sets of tracks may be less than the granularity of a GPS or similar system and the accelerometer and/or gyro may be used to supplement the knowledge of the train's position without having to rely upon fixed location transducers installed in association with the track bed.

As unforeseen conditions occur to the train as it moves along the track in accordance with the movement plan, train controller 208 can automatically determine what new train commands are practical to implement the movement plan safely. For example, if the engines are not producing as much power as expected for their power setting, train controller 208 increases the power by issuing appropriate train commands for display or implementation as discussed above.

In situations in which the unplanned disturbances prevent the controller from being able to keep the train on the movement plan, the train may return an exception notice to dispatch 204. Many times, the transmission of a message of an anomalous condition by train controller 208 will be entirely redundant as the dispatching function of dispatch 204 monitors the state of the system, particularly against the movement plan, and may be already attempting to replan the movement plan in light of the new information regarding the system state, i.e., the anomaly which has occurred to one or more trains.

Figure 5:
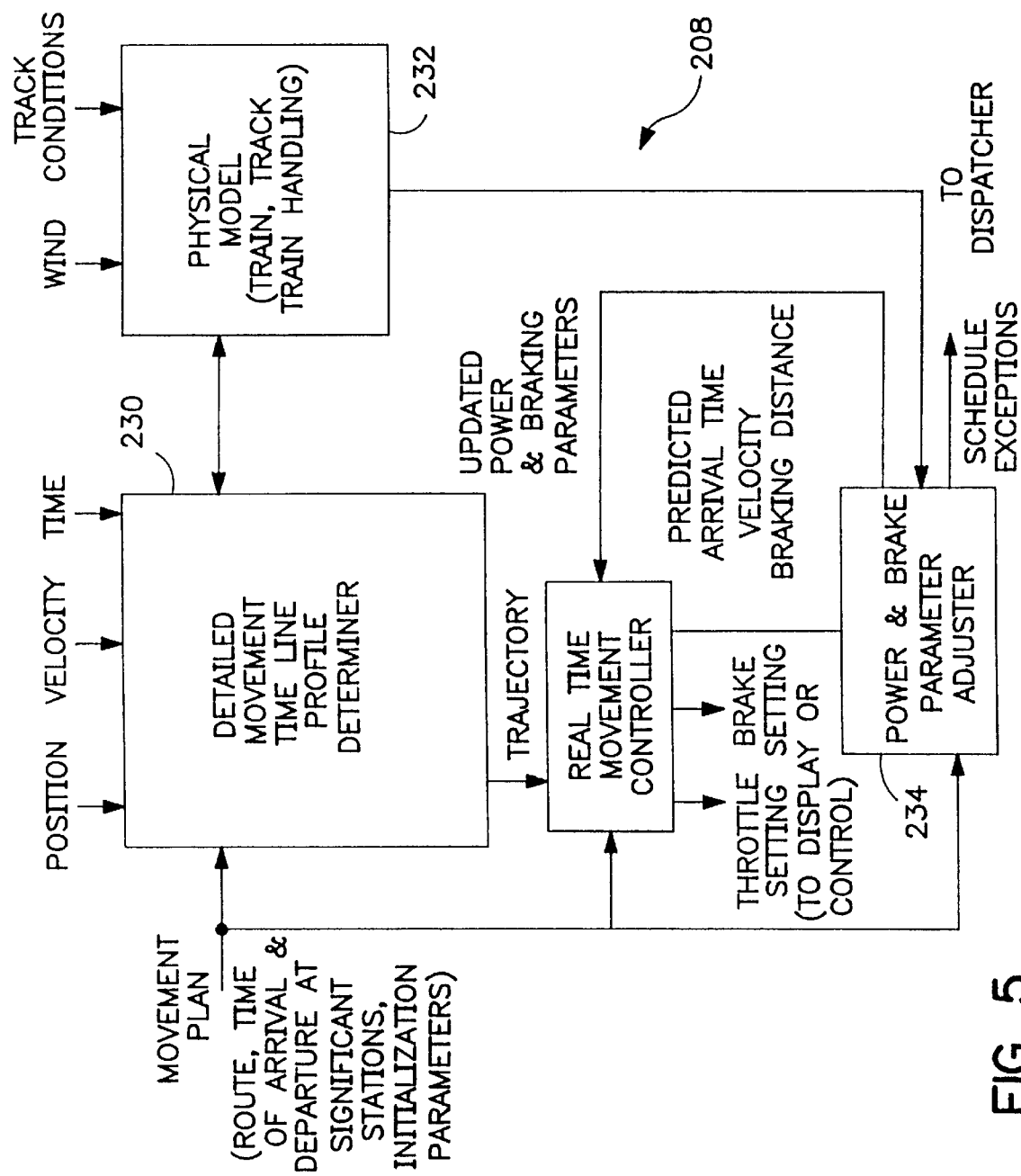
FIG. 5 is a functional block diagram of a portion of the train controller of FIG. 4.

With reference now to FIG. 5, train controller 208 may be understood with reference to the functions which may be carried out to provide the desired control of each train. Specifically, train controller 208 aboard each train controls the train in accordance with a movement plan which is based upon a high-fidelity model of a railroad.

The train's portion of the movement plan (e.g. its trip plan) may include a route (a list of track segments over which the train will pass) and the estimated time of arrival (ETA) and estimated time of departure (ETD) for each station along the route, and perhaps the velocity of the train at that point. In addition, a train's trip plan may contain an identification of the areas in which speed will be restricted due to the anticipated presence of other trains, or other factors.

As explained further below, a train's trip plan may include data regarding each station of significance (e.g., a location and time at which a train must meet, pass, or merge with another train, stop for car pickups or setouts, crew changes, or termination of the trip). As noted earlier, in addition to the movement plan and the initialization parameters, train controller 208 may receive and/or measure data indicating the prevailing wind and track conditions, the present position, the present time, the present velocity of the train, the traction motor current, the throttle position, along with the brake pipe pressure.

A detailed movement timeline profile determiner 230 may be provided to predict the movement of the train from its present position to all subsequent points on the train's trip plan. External sources assist in determining the present state of the train (present position of the train on the track, its velocity and acceleration) and the present time. The route of the train with the initialization parameters and the restricted track segments and the present state is forwarded to model 232 to perform a simulation of the movement of the train over the track.

In addition to a desired departure time window from the point of origin, and an arrival time window at the ultimate destination, the trip plan provides the ETAs and ETDs at certain intermediate locations along the route. The various changes to throttle and brake settings necessary to achieve the trip plan will be determined by the computer on board. The desired throttle and brake setting may be forwarded to the engineer's display along with optionally the ETA at the next station. Alternatively, the desired throttle and brake setting may be used to directly control actuators which automatically make the throttle adjustment. The estimated arrival time and velocity at the destination is passed to a power parameter adjuster 234. This information will be used to allow a particular train's actual performance to be compared with the predicted performance in order to automatically calibrate the model to improve subsequent predictions.

All motions of the train can be kept in conformity with signals, which act to slow or stop the train if necessary. Signal aspect data can be obtained by monitoring the signals and/or track circuits and using a communications system to relay that information for use by the train control system (the present invention). For example, the signal aspect presently governing a train may require that the train stop or operate at reduced speed. If on the other hand, the signal is displaying a "clear" aspect, the train's movement restrictions are determined by factors other than the signal. If a moving block control scheme is being used, then the position of the immediate train in front may be reported by its onboard computer and datalink. Similarly, every other train (e.g., one which is scheduled to enter any track segment in the train's route) will report its self-determined location as well.

The capability to anticipate braking needs may be provided by searching the track ahead for speed limit reductions, or may be provided by signals based upon precomputed Curves of braking distance may be pre-computed or may be computed while a train is moving. Braking distance computations may be based on the track topology (e.g., grade) underneath and ahead of the train. Train characteristics (weight, length, etc.) may als be used in the computation. In one embodiment, a capability to determine the appropriate combination of dynamic brakes, independent brakes and air brakes is provided. As the train advances incrementally in time, the position of the train relative to a specified stop condition (end of the route, signal displaying "stop" aspect, train ahead, etc.) is monitored and, the train crew is notified in advance when to stop the train. If the crew does not take appropriate and timely measures to stop the train, the onboard computer may "enforce" the stop by applying the brakes in accordance with the braking curve to stop the train short of the specified stop condition. When the stop condition occurs, the onboard computer may report a recent time history of the locations of the train along with its throttle and brake settings.

With continued reference to FIG. 5, power parameter adjuster 234 may adjust train power to assure that the train arrives at the control point on time. Power parameter adjuster 234 may compare the estimated arrival time and velocity with the detected (actual) time and velocity and compare the deviation to a user-specified allowable deviation from the movement plan. If the difference between the estimated arrival time and the actual arrival time exceeds the allowable deviation, the power parameter can be adjusted.

Figure 6:
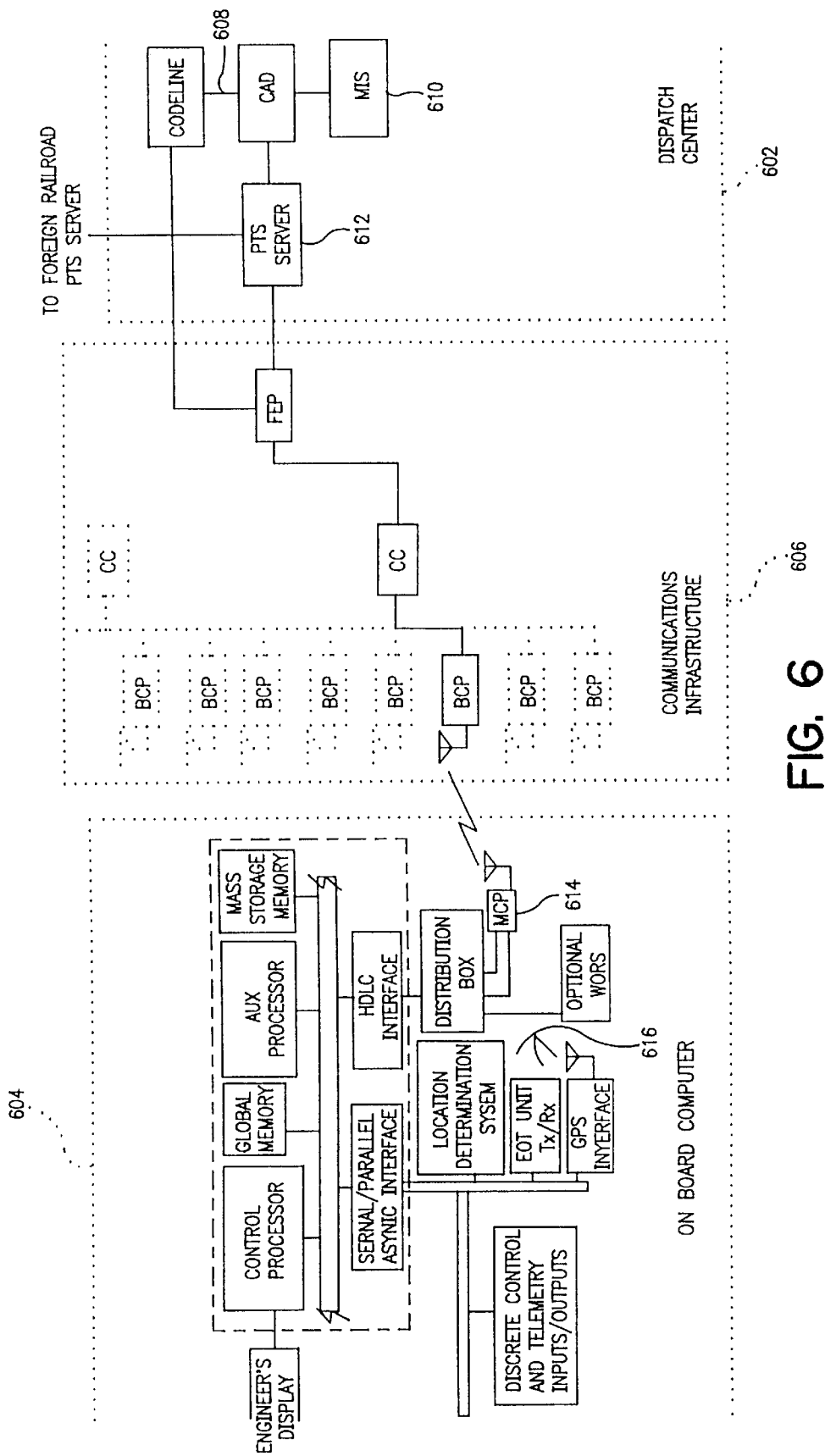
FIG. 6 is a functional block diagram of an embodiment of the positive train separation system portion of the present invention.

The portion of the present invention associated with increasing railway safety can be referred to as a positive train separation system (PTS). With reference now to FIG. 6, a preferred embodiment of a PTS system of the present invention may include a dispatch center 602 for controlling freight train movement over a network of track, an onboard computer (OBC) 604 on each train to be controlled, and an infrastructure 606 for communication between dispatch center 602 and OBC 604.

Figure 7:
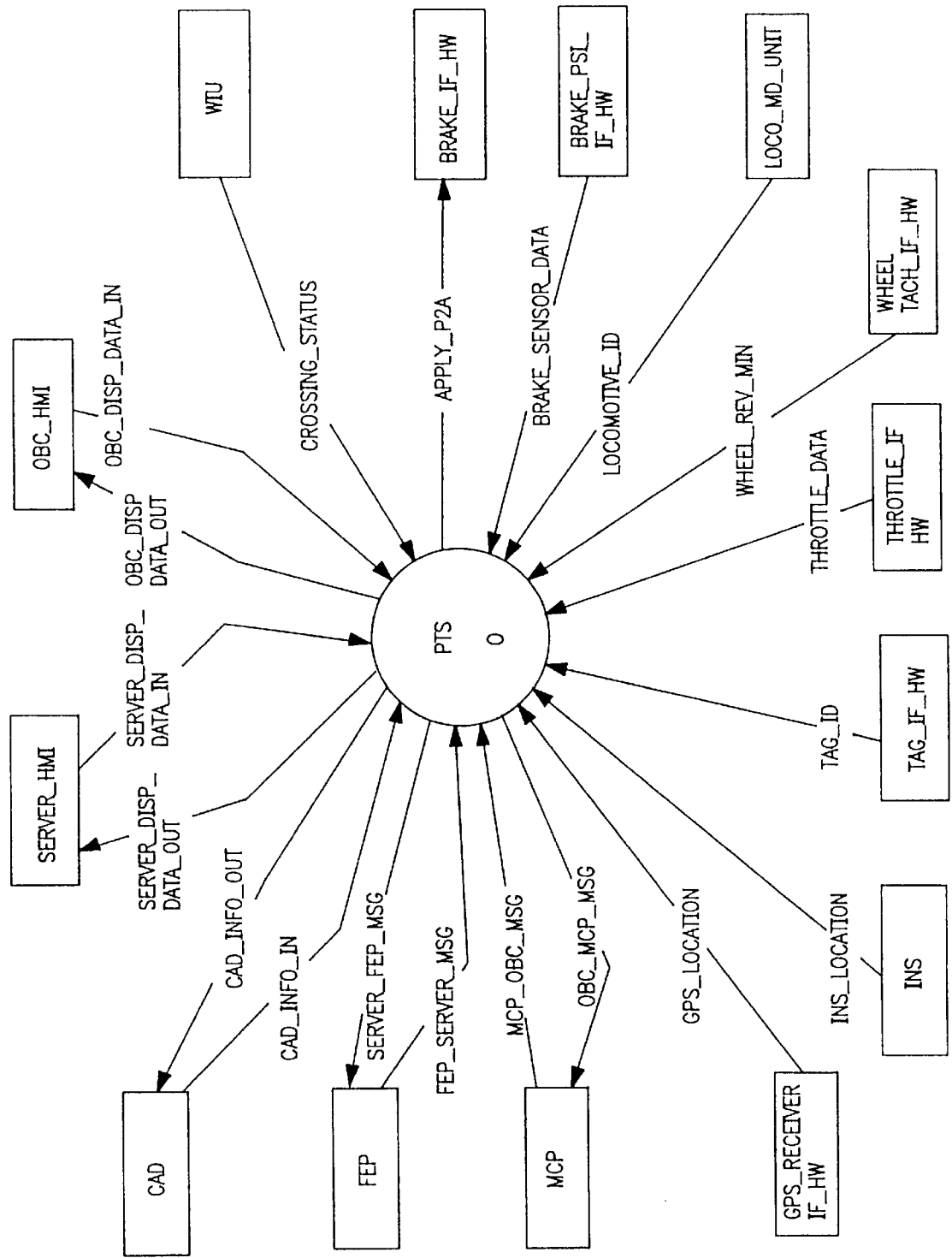
FIG. 7 is a functional diagram illustrating coordinating activities of the dispatch center server of the embodiment of FIG. 6.

Dispatch center 602 may include a computer aided dispatch (CAD) system 608 which provides a man-machine interface for the PTS system and which issues authorities and may identify trains, determine consist (i.e., initial train makeup, plus subsequent pickups and setouts) and route, and issues bulletins. CAD 608 (or PTS directly) may receive inputs from a management information system (MIS) 610 which is an alternate potential source of train consist, route and/or bulletins. A server 612 may coordinate receipt and dissemination of information regarding each train being controlled and other system operations (such as track database updates and monitoring of unattended crossings by wayside interface units). FIG. 7 illustrates the external interfaces with the PTS system. The information coordinated by server 612 may include information from trains, such as data on speed and location, which may pass through the communication infrastructure en route to CAD 608. Movement instructions may be passed through server 612 to the trains.

Communication infrastructure 606 may be a hierarchical arrangement of front-end processors (FEP), cluster controllers (CC), and base communication packages (BCP) which ensures communication with the mobile communication package (MCP) on board each train being controlled.

OBC 604 may perform a variety of crew and train management functions, and may include a MCP 614, such as a data modem with radio, for communicating with the BCPs. It may include a location determining system 616 which may use a variety of position determining devices to indicate the location of the point in the train where OBC 604 is located, and may include an end-of-train (EOT) unit for communication therewith. OBC 604 may also determine EOT location by evaluating the number and types of cars and possibly the effect of topography (compression and stretching) on the expected length. OBC 604 ensures that location information is provided to server 612 in accordance with instructions (e.g., at an appropriate update rate).

Figure 8:
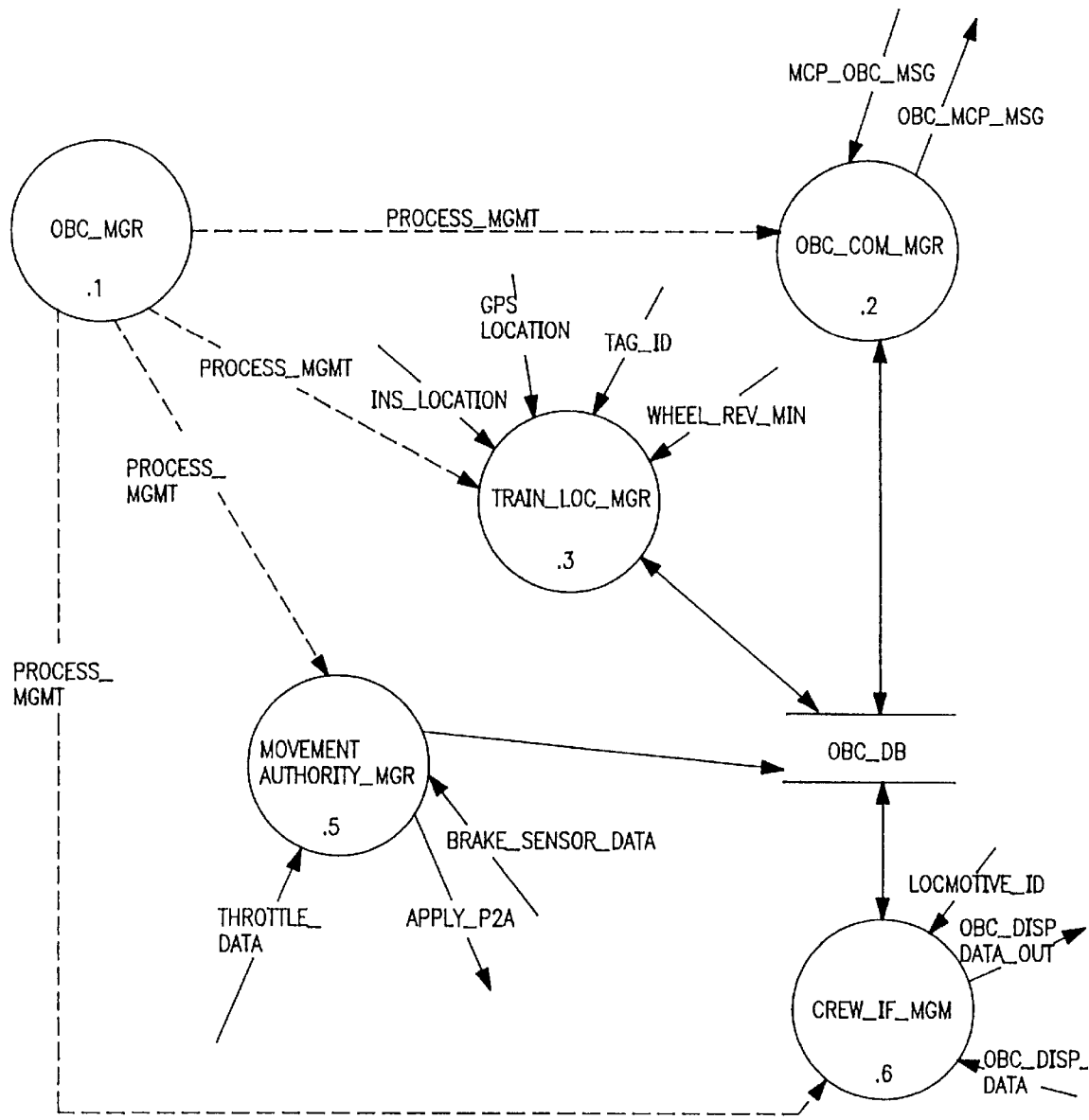
FIG. 8 is an illustration of software modules of the onboard computer of the embodiment of FIG. 6.
Figure 9:
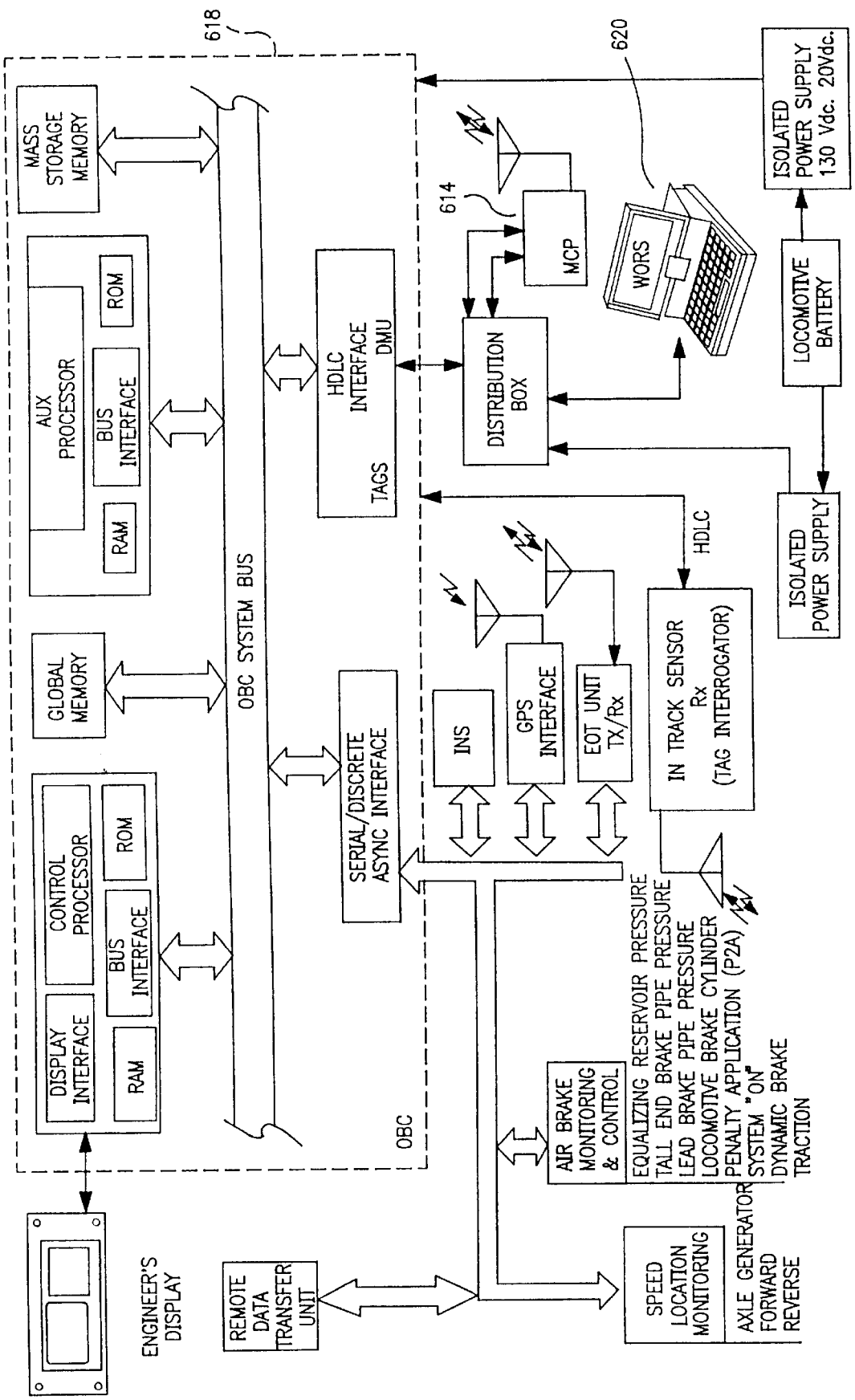
FIG. 9 is a functional block diagram of the onboard computer of the embodiment of FIG. 6.

As will be discussed in more detail below, OBC 604 also may calculate speed adjustment points using train information and track topography stored in memory. OBC 604 may include software modules for performing PTS functions, such as illustrated in FIG. 8, for communication, location determination, movement authority enforcement, and crew interface. A functional description of OBC 604 may be more clearly seen in FIG. 9. A processing unit 618 may be mounted in the locomotive, and may include conventional data storage and processing devices. An optional portable computer 620 may be used to up-load unit 618 with initialization data regarding the movement plan, track topography, orders, authorities, etc., before departure on the planned movement. The portable computer could also be used to retrieve data stored on a locomotive after a trip or series of trips. Alternatively, or in addition, this data may be provided via MCP 614 or another datalink, possibly a higher rate datalink.

One of the functions of the present invention is determining a speed adjustment point (the location in a planned movement where braking is to be initiated or a locomotive power setting changed). This function may be performed by OBC 604 when the train is underway, and by CAD 608, MIS 610 and/or server 612 during movement planning. The function may also be performed by any of these units when a planned movement is affected by an unplanned event such as the addition of a train to the system or a track or train anomaly.

The determination of the speed adjustment point desirably includes consideration of the effect of the track topography on the train. The example below refers to determination of a brake application point, and a power adjustment point determination will be similar.

Figure 10:
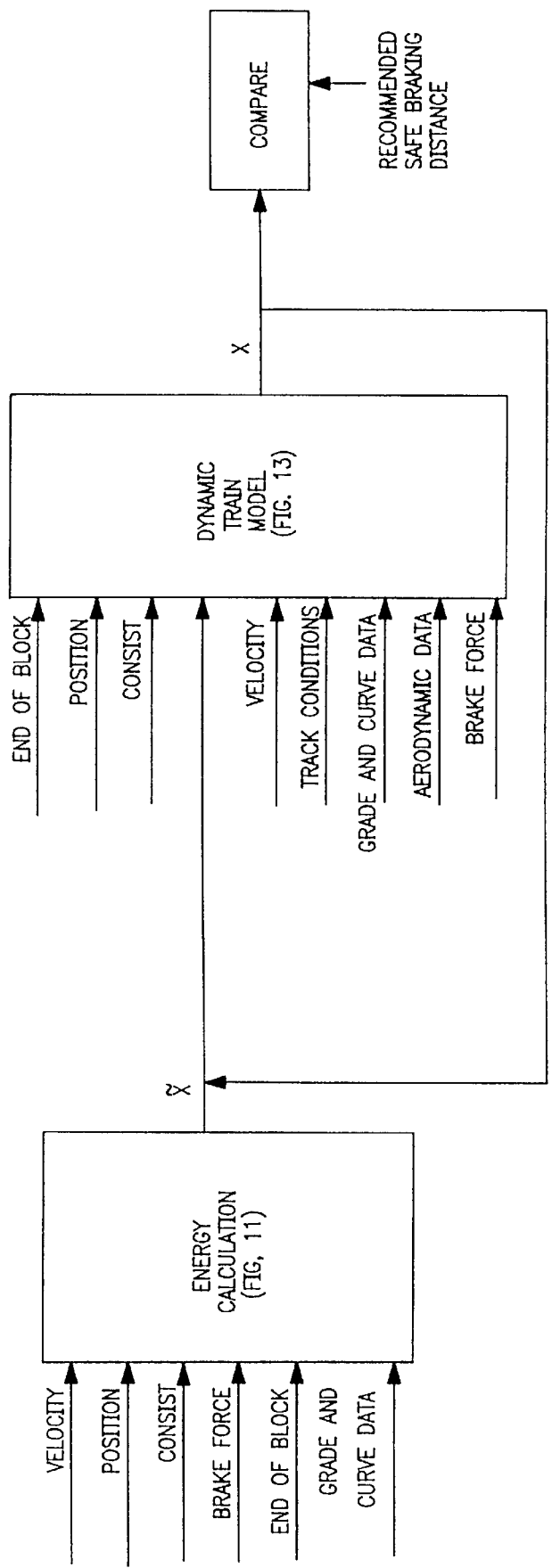
FIG. 10 is a functional block diagram of the determination of braking distance used in the present invention.
Figure 11:
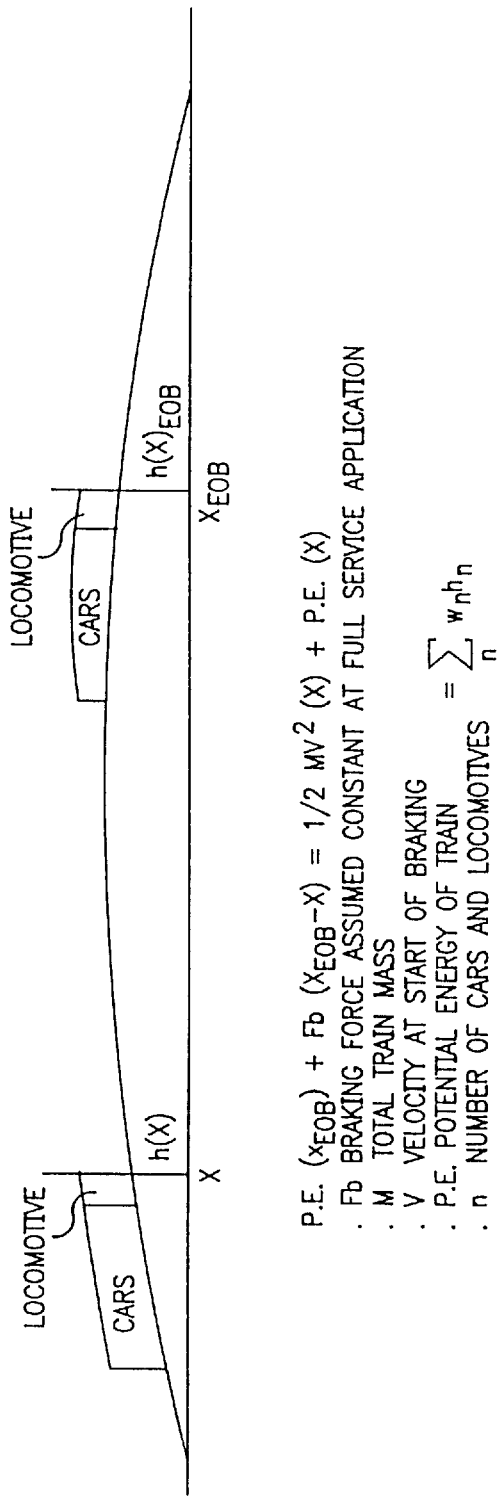
FIG. 11 is a pictorial depiction and formula for the initial determination of braking distance used in the embodiment of FIG. 10.

With reference now to FIG. 10, an initial estimate of a brake application point may be provided in view of train velocity and consist, brake force applied, and the grade and curve over which the train moves while the brakes are applied (of course, train position must be known accurately in order for applicable grade and curve information to be determinable.) The initial estimate of brake application point may be provided from an evaluation of energy, such as illustrated in FIG. 11. The potential energy at the end-of-brake (EOB) position $X_{EOB}$ plus the braking energy depleted is equal to the kinetic plus potential energy at the brake application position X. The potential energy of the train is the sum of the potential energy of each unit (cars and locomotive), which may be derived from multiplying each unit's mass times its height (e.g., altitude derived from the track topography).

Figure 12:
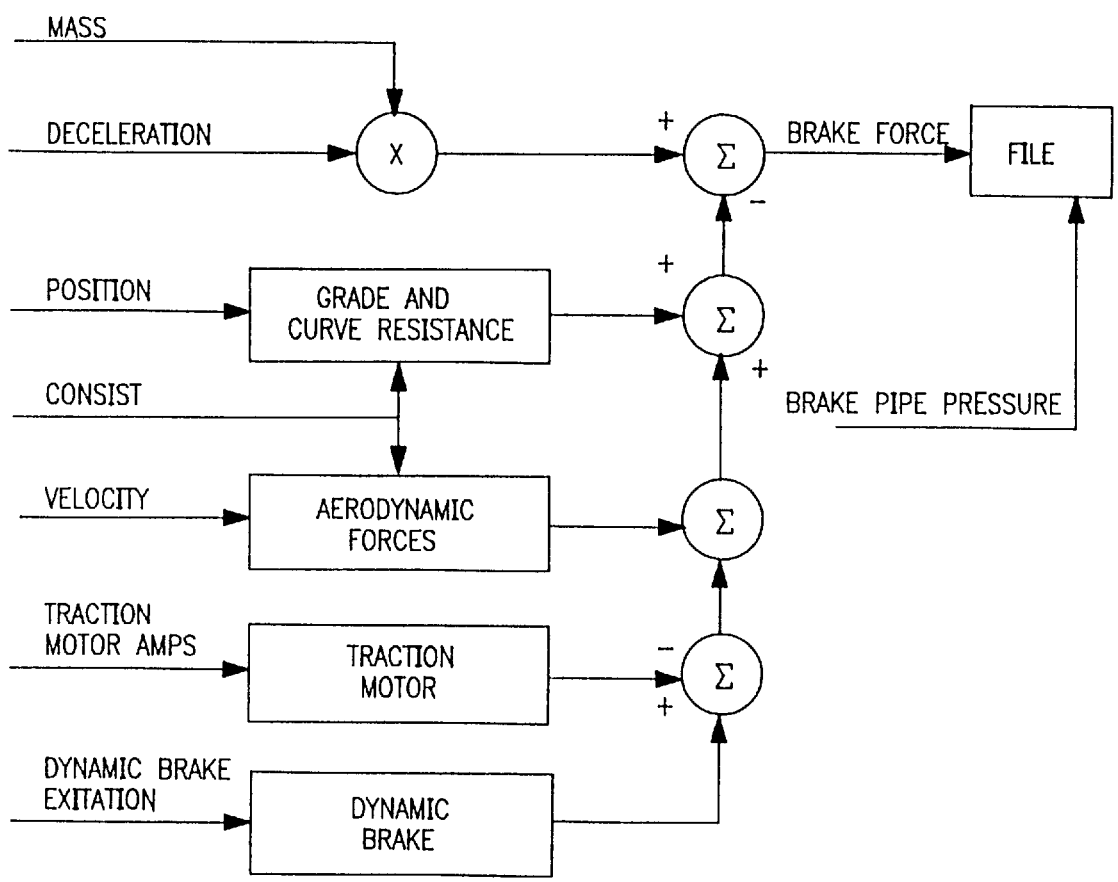
FIG. 12 is a functional block diagram of the brake force determination used in the embodiment of FIG. 10.

The brake force in the energy calculation may be derived from historical data. Parameters affecting brake force may be stored and recalled based on present inputs. For example, the particular grade, train velocity and mass, wind, traction, etc. may be used to enter tables which provide inputs to the equation depicted in FIG. 12 to estimate of the actual brake force that will be applied.

Figure 13:
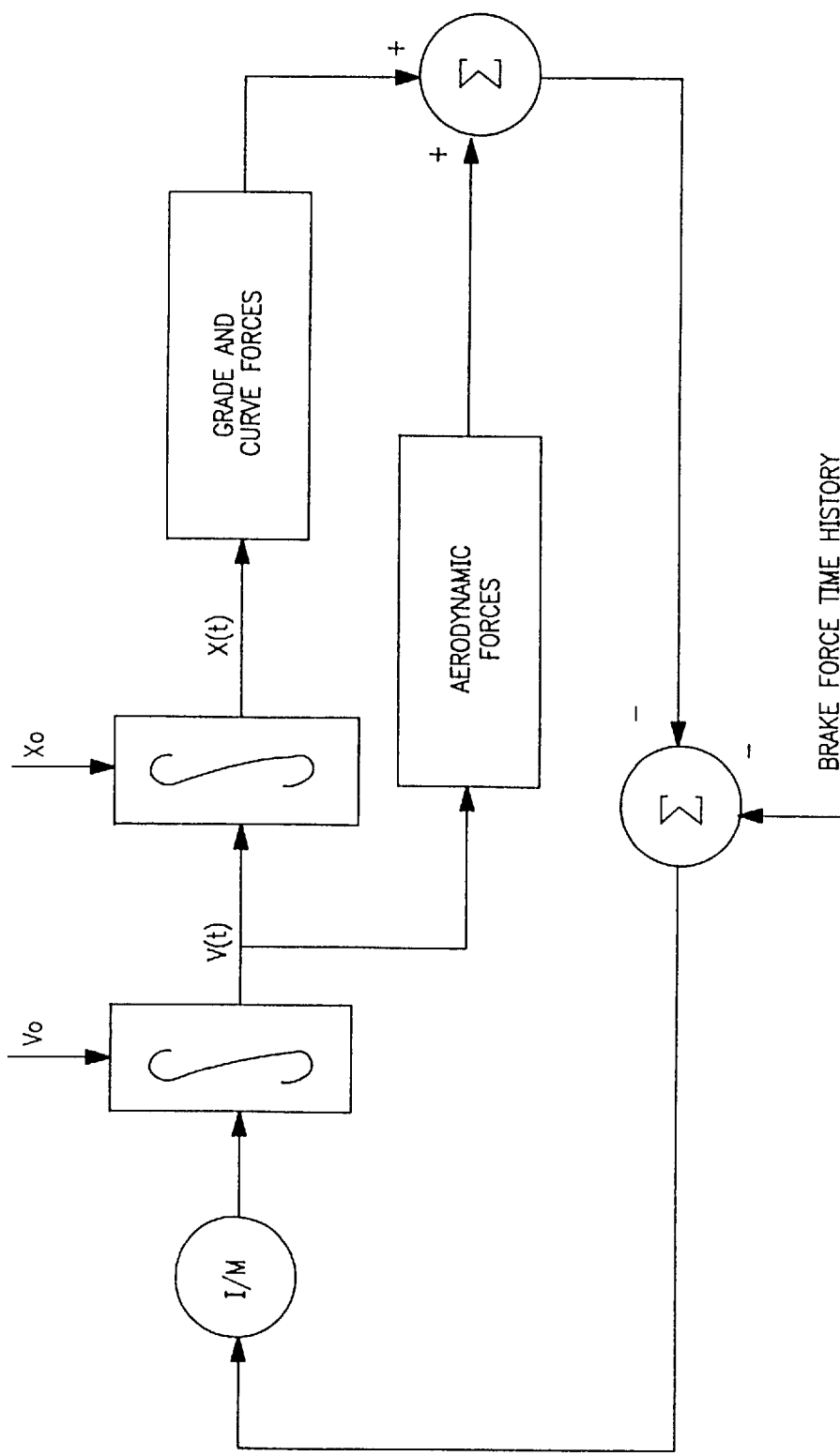
FIG. 13 is a functional block diagram of the dynamic train model used in the embodiment of FIG. 10.

Once the initial estimate of brake application point is made, the estimate may be cycled through a dynamic model to provide a final estimate based on the best available inputs. The dynamic model may be based on a differential equation, such as shown in FIG. 13 which solves F=MA for the braking distance.

Figure 14:
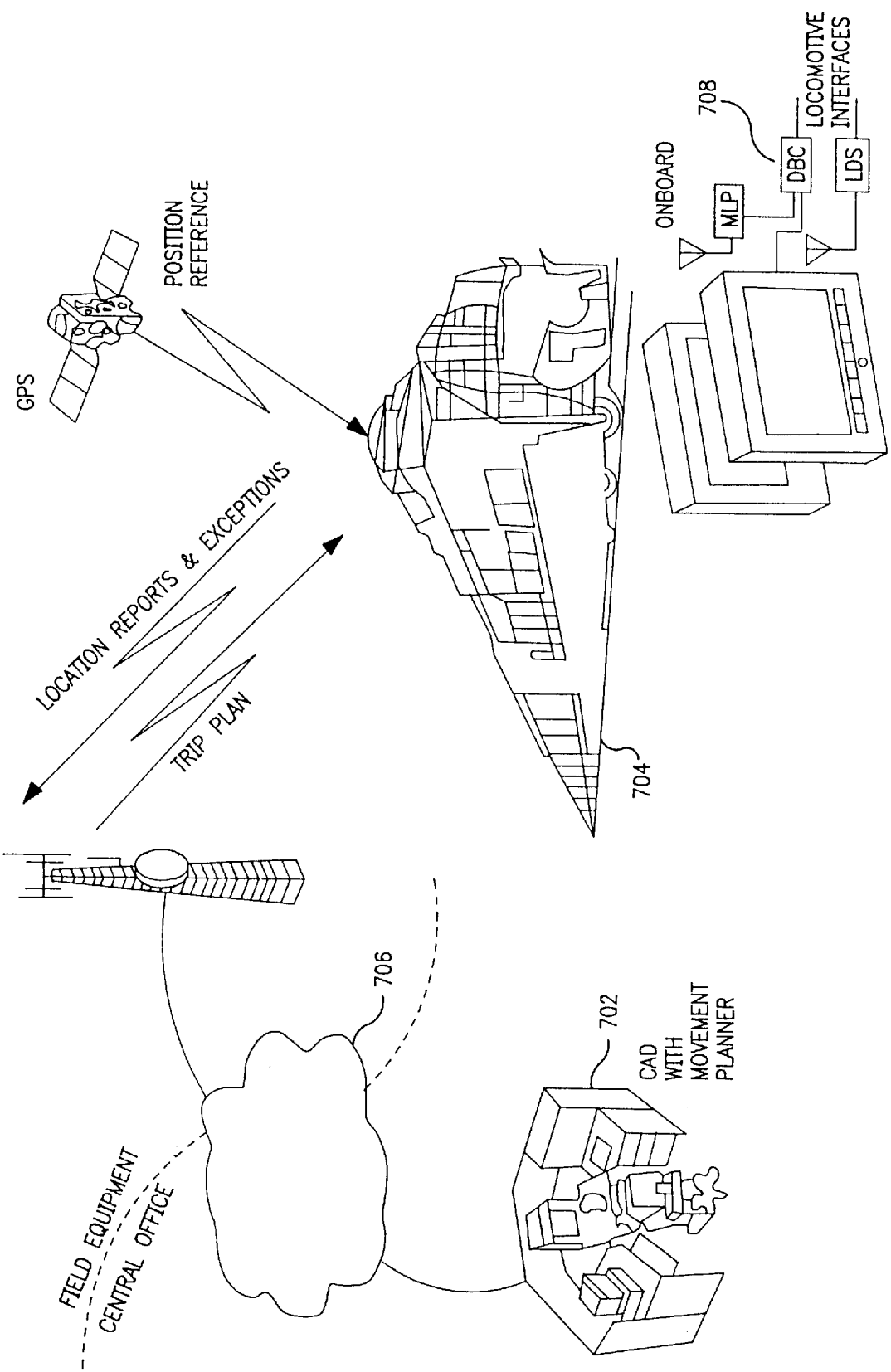
FIG. 14 is a pictorial depiction of an embodiment of a system in accordance with the present invention.

With reference now to FIG. 14, the present invention includes a Computer Assisted Dispatch ("CAD") system which can generate or receive a detailed movement plan as discussed above. This movement plan will have been developed to be realizable for the trains being controlled in a particular geographic region. Before the departure of a particular train 704, the CAD 702 will send the train's particular trip plan to the train 704 via a communications network 706. Preferably, the trip plan will consist of the and Estimated Time of Departure ("ETD") from the point of origin or for entry into the controlled area and an Estimated Time of Arrival ("ETA") at the ultimate destination or for exit from the controlled area (or the corresponding start and stop times) as well as the ETAs and ETDs for intermediate points along the route. Generally, the points selected for intermediate ETAs and ETDs (referred to as "stations of significance") will include locations of passes, meets, merges, staging, crew changes, and car or leader power setouts/pickups scheduled by the movement planner.

With continued reference to FIG. 14, the train 704 receiving its trip plan will supply the plan to the OBC 708 which will, in turn, develop a realizable trip profile (velocity profile versus time/distance) that, if followed by the specific train will achieve all the ETAs and ETDs as dictated by the movement planner for the train. The trip profile will comply with all constraints known to the OBC (speed restrictions, constraints imposed by the signaling system such as minimum train spacing, physical constraints, etc.) and will be achievable using good train handling practices and keeping in-train forces to an acceptable level.

Upon the train's departure from its yard or staging area (or its entry into the controlled area), a message is sent to the CAD. As long as the time of departure is within acceptable limits to the movement plan, nothing further needs to be done; however, sufficiently delayed or advanced departures may initiate a schedule repair within the CAD 702. Once the train is en route, the CAD 702 is informed of the position of the train 704 based on position reports from the OBC 708 and/or from wayside units. The CAD 702 may accordingly control switches and signals to setup ("line") the route as planned in the movement plan.

To ensure positive train separation, the CAD may periodically send Authority Signals to the train to specify movement limits that can be enforced by the OBC or related train equipment. In this way, if the communications between the CAD 702 and the train 704 fail, the system is ensured that the train 704 will not move beyond a safe location.

While the system of the present invention is capable of planning and operating a fleet of trains safely without the use of signal aspects, the system will also work competently within a track system which uses conventional signaling. In such a track system, the system of the present invention can establish a communication session with wayside interface units ("WIU") associated with each signal as it approaches the signal. The WIU can report the signal aspect to the train 704 in a vital manner (usually by using an error-checking, retransmission protocol). While in track systems which use the signal aspects, the OBC 708 can display the aspect of the upcoming signal (if it is monitored by a WIU) and, if desired, can enforce the signal's aspect if the operator does not respond appropriately to slow or stop the train in compliance with the aspect. Alternatively, the signals do not have to be monitored. Their effects on train movements can be predicted to the extent necessary to support the present invention.

At any time, if the CAD 702 determines or is informed by the OBC 708 or by the WIUs that the movement of the train does not conform sufficiently to the movement plan, the CAD 702 can initiate a schedule repair for the particular train in question and all other affected trains.

As explained earlier, the OBC 708 will give the operator visual cues of the actions which should be taken to maintain or restore the train to the trip profile. The cues may take any of a variety of forms, such as prescribed throttle setting, prescribed brake setting, desired speed, near term future target train location vs. time, etc. The OBC 708 will provide such cues within the bounds of speed restrictions, authorities, signal aspects (if applicable), and good train handling. If the train's deviation from the trip plan is sufficiently large that the OBC 708 is unable to correct it within safe practices, the OBC 708 will notify the CAD 702. The new or modified plan developed by the CAD 702 will be sent to all affected trains.

While preferred embodiments of the present invention have been described, it is to be understood that the embodiments described are illustrative only, and the scope of the invention is to be defined solely by the appended claims when accorded a full range of equivalence, many variations and modifications naturally occurring to those of skill in the art from a perusal hereof. As is readily apparent, the system and method of the present invention is advantageous in several aspects.

What is claimed is:

1. A method of control of a plural freight trains with varying numbers of cars and varying loads over a predetermined track layout, the method comprising the steps of:

(a) providing a railway with both periodic and non-periodic freight train service;

(b) providing a realizable movement plan for all trains over the track layout, the plan including ETAs and ETDs at all stations of significance calculated on the basis of track parameters, train handling constraints, actual train position and velocity data, wind data to the extent available, and track condition data to the extent available to cause the freight trains to operate on the trajectories indicated by the plan;

(c) updating the movement plan in response to unplanned or deviant movements of freight trains over the track layout; and (d) alternatively displaying commands (to comply with the movement timeline profile derived from the updated movement plan) to the train engineer or automatically executing power and brake settings for the locomotive in response thereto for immediate execution of the updated movement plan.

2. The method of claim 1 including the step of selectively manually overriding any automatically executed commands.

3. A method of adjusting the planned movement of plural trains traveling on a network of track in response to addition of a previously unplanned train to the network of track, or to an anomaly in the trains or in the network of track which affects movement of the trains there across, the method comprising the steps of:

(a) storing train characteristics for each of the planned trains in a central computer for the network of track, the train characteristics including the number of cars and train handling constraints;

(b) storing track characteristics for the network of track in a central computer, the track characteristics including the topography of the network of track and track parameters;

(c) providing to a central computer from each of the planned trains the locations of their respective beginning of train;

(d) revising the planned movement of the planned trains in response to an unplanned train or an anomaly, the revised planned movement including a planned movement for the previously unplanned train (if present) and a new planned movement for the planned trains, the revised planned movement taking into consideration (i) the locations of the planned and unplanned trains, (ii) the topography of the network of track along which the planned and unplanned trains are to move, and (iii) an effect of the topography on speed adjustment points in consideration of locations of the beginnings of the trains and of their respective cars; and (e) communicating the revised planned movements to the trains for immediate execution.

4. The method of claim 3 wherein the effect of the topography on the speed adjustment points is determined by the method comprising the steps of:

(a) determining an initial brake application point in consideration of brake factors comprising train velocity, position, consist, brake force, and aerodynamic data and the track topography in the vicinity of the initial brake application point; and (b) updating the initial brake application point in view of updated brake factors so as to achieve a desired train velocity at a predetermined location.

5. The method of claim 4 wherein the brake factors further comprise the locations of the cars in the trains.

6. The method of claim 5 wherein the brake factors further comprise the effect of topography-induced stretching and compression on the locations of the cars.

7. The method of claim 3 wherein the effect of the topography on the speed adjustment points is determined by the method comprising the step of evaluating the change of potential energy of a train to be braked between the train's beginning and end-of-braking points by considering the track topography at the locations of each of the cars in the train when the beginning of the train is at the beginning-of-braking versus at the end-of-braking points.

8. The method of claim 7 further comprising the step of determining the potential energy of each of the cars in the one train by multiplying its mass times its altitude.

9. The method of claim 8 wherein the locations of the cars in the one train are determined in consideration of the effect of topography-induced stretching and compression on the locations of the cars.

10. A method for precisely controlling the movement of plural trains along a network of track according to a predetermined movement plan comprising:

(a) providing to each of the plural trains its respective portion of the movement plan (i.e., its "trip plan") before departure on the planned movement;

(b) determining the position of each train along the track;

(c) evaluating the adherence of each train to its trip plan;

(d) determining trip plan and/or speed adjustments needed by any train not adhering to its trip plan, taking into consideration the effects of the topography of the track on the adjustments; and (e) communicating the trip plan adjustments to each train.

11. The method of claim 10 wherein trip plan and/or speed adjustments are determined based on the step of evaluating an effect of the topography on train brake application points in consideration of locations of the beginnings of the trains and of their respective cars.

12. The method of claim 11 wherein the effect of the topography on the train brake application points is evaluated by the method comprising the step of evaluating the change of potential energy of a train to be braked between the train's beginning-of-braking and end-of-braking points by considering the track topography at the locations of each of the cars in the train when the beginning of the train is at the beginning-of-braking and end-of-braking points.

13. The method of claim 12 wherein the locations of the cars in the train are determined in consideration of the effect of topography-induced stretching and compression on the locations of the cars.

14. The method of claim 10 wherein the step of determining the trip plan and/or speed adjustments comprises the step of evaluating an effect of the topography on train power application points in consideration of locations of the beginnings of the trains and of their respective cars.

15. The method of claim 10 including the further step of modifying the speed adjustments so as to asymptotically approach the trip plan.

16. The method of claim 10 wherein each train's portion of the movement plan (i.e., its trip plan) is provided to a selectively installed onboard computer which derives and provides instructions for implementing the trip plan when installed therein.

17. The method of claim 16 further comprising the step of communicating the trip plan from a central computer associated with or comprising the train dispatch system to the onboard computer.

18. The method of claim 17 wherein the onboard computer automatically makes the speed adjustments.

19. A system for precisely controlling the movement of plural trains along a network of track according to a predetermined movement plan comprising:

(a) means for providing to each of the plural trains its trip plan before departure on the planned movement;

(b) means for determining the position of each of the plural trains along the track;

(c) means for evaluating the adherence of each of the plural trains to the predetermined movement plan (its trip plan);

(d) means for determining the movement plan adjustments needed by any of the plural trains not adhering to the predetermined movement plan and all others affected, said means comprising means for determining the effects of the topography of the track on the adjustments; and, (e) means for communicating said trip plan adjustments to the plural trains.

20. The system of claim 19 wherein the means for determining the movement plan or speed adjustments comprises means for evaluating an effect of the topography on train brake application points in consideration of locations of the beginnings of the trains and of their respective cars.

21. The system of claim 19 wherein the means for evaluating the effect of the topography on the train brake application points comprises one of three possible algorithms for determining the braking distance:

(a) Given the track profile and an estimate of the total braking force a reasonable estimate of the braking distance can be obtained by the conservation of energy method.

(b) Using the conservation of energy method to obtain an initial estimate of the stopping distance, a differential equation method which models all the forces on the train is used to provide a more precise estimate.

(c) Using only the differential equation method described above, a precise estimate of the stopping distance can be made with the expense of more processing. This last method is much more robust than the above methods in that it is totally adaptive in nature sensing only the throttle position, the brake pipe pressure, the acceleration and the track profile to recursively update the model of the train and then use the differential method to predict the stopping distance.

22. The system of claim 21 further comprising means for determining the effect of topography-induced stretching and compression on the locations of the cars.

23. The system of claim 19 wherein the means for determining the movement plan or speed adjustments comprises means for evaluating an effect of the topography on train power application points in consideration of locations of the beginnings of the trains and of their respective cars.

24. The system of claim 19 further comprising an onboard computer selectively installed in the plural trains for storing each train's trip plan thereto and for deriving and providing instructions for implementing the train's trip plan when installed therein.

25. The system of claim 24 further comprising a data radio attached to said onboard computer for communicating the trip plan adjustments from a train dispatcher to said onboard computer.

26. The system of claim 25 wherein said onboard computer is connected to train speed controls so as to automatically make the speed adjustments.

27. The system of claim 19 wherein said means for evaluating comprises moving block control.

28. The system of claim 19 further comprising a computer aided dispatch system remote from the plural trains for overriding the control of the trains.

29. A method of controlling movement of a freight train having a multiplicity of cars over a track having a known topography, the method comprising the steps of:

(a) providing a trip plan for the train which takes into account the effect of the track topography on train speed adjustment points;

(b) revising the trip plan in response to deviations from the movement plan, the revisions taking into account the effect of the track topography on train speed adjustment points; and (c) wherein the effect of track topography is determined by the method comprising the step of evaluating the effect of track topography on each of the cars in the train.

30. The method of claim 29 further comprising the step of considering the effect of topography-induced stretching and compression on the locations of the cars.

31. The method of claim 29 wherein the effect of the topography on the cars in the train is evaluated by the method comprising the step of evaluating the change of potential energy of each of the cars between the car's location at the beginning of the speed adjustment and the location at the end of the speed adjustment.

32. The method of claim 31 further comprising the step of determining the potential energy of each of the cars by multiplying its mass times its altitude.

33. A method of controlling plural freight trains moving over a network of tracks, comprising the steps of:

(a) determining a movement plan of operating the plural trains over the track;

(b) communicating the relevant portion of the movement plan (i.e. the trip plan) to each one of the trains;

(c) generating planned trajectories for each of the trains in accordance with its determined trip plan;

(d) determining throttle and brake settings related to the first planned movement timeline profile;

(e) controlling the one train in accordance with said settings;

(f) communicating a second trip plan before the one train reaches the end of the first trip plan; and (g) repeating steps (c), (d) and (e) for the second planned movement timeline profile.

34. The method of claim 33 wherein said determining is performed on the basis of track parameters.

35. The method of claim 33 wherein said determining is performed on the basis of train handling constraints.

* * * * *